United States Patent
Long

(10) Patent No.: US 9,160,567 B2
(45) Date of Patent: Oct. 13, 2015

(54) METHOD, APPARATUS, AND SYSTEM FOR ESTABLISHING A VIRTUAL LOCAL AREA NETWORK CONNECTION

(75) Inventor: Hao Long, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 63 days.

(21) Appl. No.: 13/116,801

(22) Filed: May 26, 2011

(65) Prior Publication Data

US 2011/0222439 A1 Sep. 15, 2011

Related U.S. Application Data

(63) Continuation of application No. PCT/CN2009/075110, filed on Nov. 24, 2009.

(30) Foreign Application Priority Data

Nov. 26, 2008 (CN) .......................... 2008 1 0217686

(51) Int. Cl.
*H04L 12/28* (2006.01)
*H04L 12/46* (2006.01)
*H04L 12/723* (2013.01)
*H04L 12/725* (2013.01)
*H04L 12/913* (2013.01)

(52) U.S. Cl.
CPC ........ *H04L 12/4633* (2013.01); *H04L 12/4641* (2013.01); *H04L 45/302* (2013.01); *H04L 45/507* (2013.01); *H04L 47/724* (2013.01)

(58) Field of Classification Search
None
See application file for complete search history.

(56) References Cited

U.S. PATENT DOCUMENTS

| 6,236,654 | B1* | 5/2001 | Egbert .......................... 370/392 |
| 6,515,969 | B1 | 2/2003 | Smith |
| 2005/0066036 | A1 | 3/2005 | Gilmartin |
| 2005/0220096 | A1 | 10/2005 | Friskney et al. |
| 2007/0071012 | A1* | 3/2007 | Park et al. ................ 370/395.53 |
| 2007/0086361 | A1 | 4/2007 | Allan et al. |
| 2007/0291790 | A1* | 12/2007 | Ue et al. ........................ 370/468 |

(Continued)

FOREIGN PATENT DOCUMENTS

| CN | 1424671 A | 6/2003 |
| CN | 1474564 A | 2/2004 |

(Continued)

OTHER PUBLICATIONS

"IEEE Standards for Local and Metropolitan Area Networks: Virtual Bridged Local Area Networks" IEEE. Dec. 8, 1998:76-79 and 147-148.

(Continued)

*Primary Examiner* — Nicholas Sloms
(74) *Attorney, Agent, or Firm* — Brinks Gilson & Lione

(57) ABSTRACT

A method for establishing a Virtual Local Area Network (VLAN) connection is provided, which includes: receiving a first signaling message, in which the first signaling message includes an unused VLAN ID and explicit routing information; registering the VLAN ID by using the at least one unused VLAN ID; and sending the first signaling message according to the explicit routing information. Several node apparatuses and several systems are also provided in the present invention. Therefore, automatic VLAN configuration is performed in an environment without a spanning tree protocol, and traffic engineering is supported simultaneously.

11 Claims, 11 Drawing Sheets

(56) References Cited

U.S. PATENT DOCUMENTS

| | | | |
|---|---|---|---|
| 2008/0049621 A1* | 2/2008 | McGuire et al. | 370/236.2 |
| 2008/0107027 A1 | 5/2008 | Allan et al. | |
| 2009/0135848 A1* | 5/2009 | Chan et al. | 370/464 |
| 2013/0117766 A1* | 5/2013 | Bax et al. | 719/323 |

FOREIGN PATENT DOCUMENTS

| | | |
|---|---|---|
| CN | 1538682 A | 10/2004 |
| CN | 1852218 A | 10/2006 |
| CN | 101136782 A | 3/2008 |
| CN | 101741678 B | 2/2012 |
| EP | 1 509 013 A2 | 2/2005 |
| JP | 2004-241979 | 8/2004 |

OTHER PUBLICATIONS

"IEEE Standards for Local and Metropolitan Area Networks Virtual Bridged Local Area Networks" IEEE Computer Society. May 7, 2003.

Kikuta, Kou et al. "Multi-Domain VLAN Path Signaling Method Having Tag Swapping Function for GMPLS Controlled Wide Area Layer-2 Network" IEICE Trans. Commun. .Jul. 4, 2008:9-12.

Fedyk, Don et al. "GMPLS Control of Ethernet draft-fedyk-gmpls-ethernet-pbt-01.txt" The Internet Society. Oct. 2006.

IEEE Standards for Local and Metropolitan Area Networks—Virtual Bridged Local Area Networks Amendment 7: Multiple Registration Protocol IEEE Computer Society. Jun. 22, 2007.

Office Action (including partial translation) issued in corresponding Chinese Patent Application No. 200810217686.4; mailed Jun. 24, 2011.

Extended European Search Report issued in corresponding European Patent Application No. 09828633.9, mailed Nov. 23, 2011.

Fedyk et al., "GMPLS Control of Ethernet PBB-TE" Internet Draft, Jul. 14, 2008.

Kamite et al., "Requirements for Multicast Support in Virtual Private LAN Services" Network Working Group, Aug. 5, 2008.

Lasserre et al., "Virtual Private LAN Service (VPLS) Using Label Distribution Protocol (LDP) Signaling" Network Working Group, Jan. 2007.

Written Opinion of the International Searching Authority of the International Searching Authority issued in corresponding PCT Application PCT/CN2009/075110; mailed Mar. 4, 2010.

The International Searching Report issued in corresponding PCT Application PCT/CN2009/075110; mailed Mar. 4, 2010.

Office Action issued in corresponding European Patent Application No. 09828633.9, mailed Aug. 22, 2013, 6 pages.

Kawakami et al., "Method to Set up LSP using VLAN Tag Switching" CCAMP Working Group, Jun. 2003, 20 pages.

\* cited by examiner

METHOD, APPARATUS, AND SYSTEM FOR ESTABLISHING A VIRTUAL LOCAL AREA NETWORK CONNECTION

CROSS-REFERENCE TO RELATED APPLICATIONS

This application is a continuation of International Application No. PCT/CN2009/075110, filed on Nov. 24, 2009, which claims priority to Chinese Patent Application No. 200810217686.4, filed on Nov. 26, 2008, both of which are hereby incorporated by reference in their entireties.

FIELD OF THE INVENTION

The present invention relates to the field of communications, and more particularly to a method, an apparatus, and a system for establishing a virtual local area network connection.

BACKGROUND OF THE INVENTION

As a Local Area Network (LAN) technology, Ethernet is more and more widely applied since its birth, and currently, is used in operator networks as an access convergence technology. In the current operator networks, the networks are relatively simple, and a Virtual Local Area Network (VLAN) connection is generally established through network management configuration. However, with wider and wider application of the Ethernet, the networks get more and more complex, and a high cost may be caused by configuration through merely network management Currently, a mechanism of automatically registering a VLAN, that is, Generic VLAN Registration Protocol (GVRP), is defined, which runs in an environment of a spanning tree protocol. When a VLAN is configured at an edge port, the GVRP mechanism spreads the VLAN information in a network, and if a port that receives a GVRP packet with a same VLAN ID in two directions in the network, the VLAN ID is automatically registered on the port.

The current GVRP mechanism requires the support of the spanning tree protocol. If the spanning tree protocol is not supported, the GVRP packet will form a loop when being delivered in the network, therefore cause impact on the VLAN connection. However, in a practical network, a spanning tree rarely used due to a slow convergence time, so the GVRP is rarely used in practice. In addition, the GVRP does not support traffic engineering, but the practical network always requires the support of traffic engineering.

SUMMARY OF THE INVENTION

Accordingly, an embodiment of the present invention provides a method for establishing a Virtual Local Area Network (VLAN) connection, which is capable of performing automatic VLAN configuration in an environment without a spanning tree protocol.

In an embodiment, the present invention provides a method for establishing a VLAN connection, which includes the following steps.

A first signaling message is received, in which the first signaling message includes at least one unused VLAN ID and explicit routing information.

A VLAN ID is registered by using the at least one unused VLAN ID.

The first signaling message is sent according to the explicit routing information.

In an embodiment, the present invention further provides a method for establishing a VLAN connection, which includes the following steps.

A source node acquires at least one unused VLAN ID and explicit routing information, registers a VLAN ID by using the at least one unused VLAN ID, and sends a first signaling message, in which the first signaling message includes the at least one unused VLAN ID and the explicit routing information, and the signaling flows through nodes according to the explicit routing information.

At least one intermediate node receives the first signaling message, registers a VLAN ID by using the at least one unused VLAN ID in the first signaling message, and sends the first signaling message according to the explicit routing information in the first signaling message.

A sink node receives the first signaling message, and registers a VLAN ID by using the at least one unused VLAN ID in the first signaling message.

In an embodiment, the present invention further provides a node apparatus, which includes a receiving module, a registration module, and a sending module.

The receiving module is configured to receive a first signaling message, in which the first signaling message includes at least one unused VLAN ID and explicit routing information.

The registration module is configured to register a VLAN ID by using the at least one unused VLAN ID.

The sending module is configured to send the first signaling message according to the explicit routing information.

In an embodiment, the present invention further provides a system for establishing a VLAN connection, which includes a source node, at least one intermediate node, and a sink node.

The source node is configured to acquire at least one unused VLAN ID and explicit routing information; register a VLAN ID by using the at least one unused VLAN ID; send a first signaling message, in which the first signaling message includes the at least one unused VLAN ID and the explicit routing information, and the signaling flows through nodes according to the explicit routing information.

The at least one intermediate node is configured to receive the first signaling message; register a VLAN ID by using the at least one unused VLAN ID in the first signaling message; and send the first signaling message according to the explicit routing information in the first signaling message.

The sink node is configured to receive the first signaling message; and register a VLAN ID by using the at least one unused VLAN ID in the first signaling message.

In an embodiment, the present invention further provides a method for establishing a VLAN connection, which includes the following steps.

Link information is acquired, in which the link information includes port bandwidth information of each neighbor node.

A first signaling message is received, in which the first signaling message includes at least one unused VLAN ID, bandwidth request information, and explicit routing information.

A message carried by the first signaling message is stored in the node, and is sent to the first signaling message according to the explicit routing information.

If a second signaling message is received, and the second signaling message is a feedback signal sent by the first signaling message according to the explicit routing information, whether node port bandwidth satisfies the bandwidth request information is determined according to the link information of the node; and if yes, the second signaling message is sent, and a VLAN ID is registered.

In an embodiment, the present invention further provides a method for establishing a VLAN connection, which includes the following steps.

A source node acquires at least one unused VLAN ID, explicit routing information, and link information; and sends a first signaling message, in which the first signaling message includes at least one unused VLAN ID, bandwidth request information, and explicit routing information.

At least one intermediate node receives the first signaling message, stores a message carried by the first signaling message in the node, and sends the first signaling message.

A sink node acquires link information of the node, receives the first signaling message sent by the intermediate node, and determines whether node port bandwidth satisfies the bandwidth request information according to the link information of the node; and if yes, sends a second signaling message, in which the second signaling message is a feedback signal sent by the first signaling message according to the explicit routing information, and registers a VLAN ID.

If receiving the second signaling message, the at least one intermediate node determines whether node port bandwidth satisfies the bandwidth request information according to the link information of the node; and if yes, sends the second signaling message, and registers a VLAN ID.

The source node receives the second signaling message sent by the intermediate node, determines whether node port bandwidth satisfies the bandwidth request information according to the link information of the node; and if yes, registers a VLAN ID.

In an embodiment, the present invention further provides a node apparatus, which includes a third receiving module, a storage module, a third collecting module, a third determination module, a registration module, and a third sending module.

The third receiving module is configured to receive a first signaling message or second signaling message, in which the first signaling message includes at least one unused VLAN ID, bandwidth request information, and explicit routing information, and the second signaling message is a feedback signal sent by the first signaling message according to the explicit routing information; send the first signaling message to the storage module when receiving the first signaling message; and send the second signaling message to the third determination module when receiving the second signaling message.

The storage module is configured to store various information in the first signaling message, in which the first signaling message includes a VLAN ID, bandwidth request information, and explicit routing information; and send the first signaling message to the third sending module and the third determination module.

The third collecting module is configured to collect link information, in which the link information includes port bandwidth information of each neighbor node.

The third determination module is configured to receive link information and the first signaling message, determine whether the port bandwidth information acquired according to the link information satisfies the bandwidth request information; and if yes, send a VLAN ID to the registration module, and send a second signaling message to the third sending module.

The registration module is configured to register a VLAN ID at a port.

The third sending module is configured to send the first signaling message or the second signaling message.

In an embodiment, the present invention further provides a system for establishing a VLAN connection, which includes a first node and a second node.

The first node is configured to collect routing information and link information, in which the routing information includes a network topology and an updated network VLAN ID database, and the link information includes port bandwidth information of each neighbor node; acquire explicit routing information and at least one unused VLAN ID according to the routing information; and send a first signaling message, in which the first signaling message includes a VLAN ID, bandwidth request information, and the explicit routing information.

The second node is configured to collect link information, in which the link information includes port bandwidth information of each neighbor node; receive the first signaling message, and determine whether the node port bandwidth information acquired according to the link information satisfies the bandwidth request information; and if yes, register a VLAN ID, and send a second signaling message, in which the second signaling message is a feedback signal sent by the first signaling message according to the explicit routing information.

The first node is further configured to determine whether node port bandwidth satisfies the bandwidth request information according to the link information of the node when receiving the second signaling message; and if yes, register a VLAN ID.

The technical solutions according to the embodiments of the present invention are capable of performing automatic VLAN configuration in an environment without a spanning tree protocol.

DETAILED DESCRIPTION OF THE EMBODIMENTS

Figure 1A:
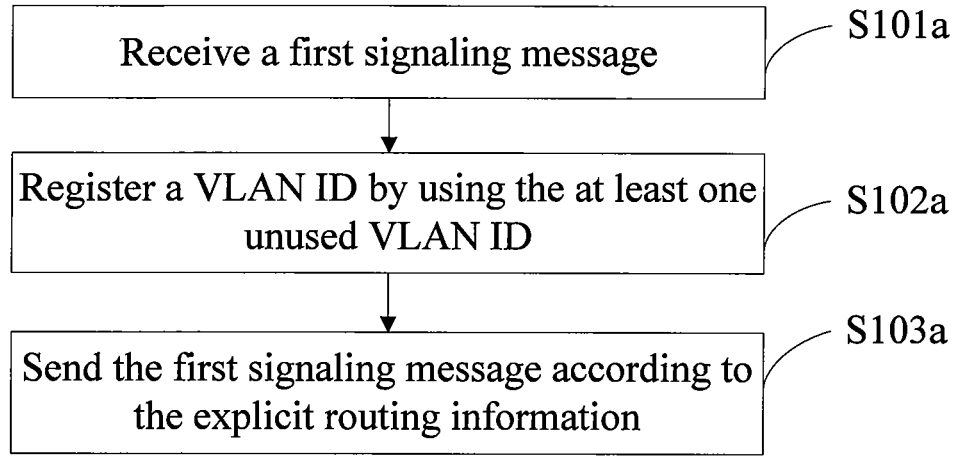
FIG. 1a is a flow chart of a method for establishing a VLAN connection according to an embodiment of the present invention.

The process of a method according to an embodiment of the present invention is shown in FIG. 1a, which includes the following steps.

Step S101a: Receive a first signaling message, in which the first signaling message includes at least one unused VLAN ID and explicit routing information.

The at least one unused VLAN ID and the explicit routing information in the first signaling message can be obtained by collecting routing information. The routing information includes a network topology and an updated network VLAN ID database. The explicit routing information and the at least one unused VLAN ID are acquired according to the routing information; or the at least one unused VLAN ID and the explicit routing information are directly acquired by being allocated through network management.

Step S102a: Register a VLAN ID by using the at least one unused VLAN ID.

Step S103a: Send the first signaling message according to the explicit routing information.

In this embodiment, when a point-to-point VLAN connection is established, the first signaling message may further include bi-directional indication information, in which the bi-directional indication information indicates that a same VLAN ID is used in both forward and backward directions; and the registering the VLAN ID is registering a VLAN ID and performing an operation according to the bi-directional indication information.

In this embodiment, when a point-to-point VLAN connection is established, the first signaling message may further include an instruction for disabling a learning function, in which the instruction for disable a learning function indicates that the learning function of nodes receiving the first signaling message are disabled within the VLAN.

The registering the VLAN ID is registering a VLAN ID and performing the instruction for disabling a learning function.

In this embodiment, when a point-to-multipoint VLAN connection is established, the first signaling message including the at least one unused VLAN ID may include that: the first signaling message includes an uplink VLAN ID and a downlink VLAN ID; and the registering the VLAN ID includes that the uplink VLAN ID is registered at an uplink port and the downlink VLAN ID is registered at a downlink port.

In this embodiment, when a point-to-multipoint VLAN connection is established, the first signaling message may further include an instruction for sharing learning, in which the instruction for sharing learning indicates that an uplink VLAN and a downlink VLAN are set as a sharing learning mode.

The registering the VLAN ID may further include: performing the instruction for sharing learning.

In this embodiment, when a multipoint-to-multipoint VLAN connection is established, the first signaling message may further include bi-directional indication information, in which the bi-directional indication information indicates that the same VLAN ID is used in both forward and backward directions; and the registering the VLAN ID includes: registering a VLAN ID, and performing an operation according to the bi-directional indication information.

In this embodiment, when a multipoint-to-multipoint VLAN connection is established, the first signaling message may further include an instruction for enabling a learning function, in which the instruction for enabling a learning function indicates to enable a learning function within the VLAN.

The registering the VLAN ID may include: registering a VLAN ID and performing the instruction for enabling a learning function.

The technical solution according to the embodiment of the present invention is capable of performing automatic VLAN configuration in an environment without a spanning tree protocol.

Figure 1B:
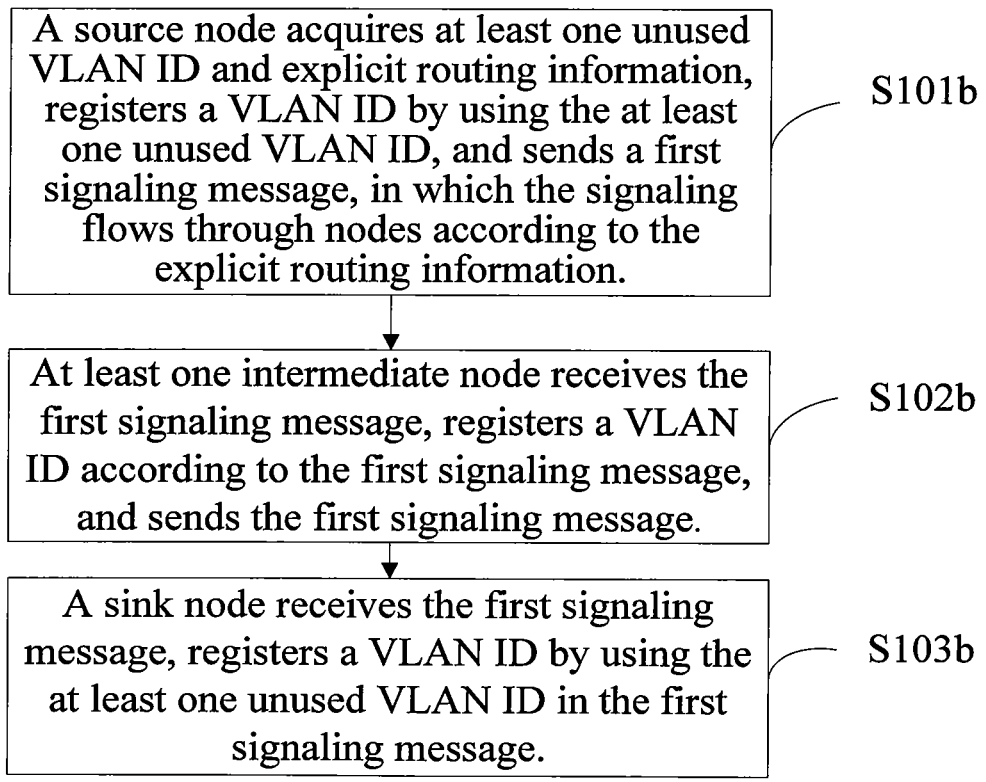
FIG. 1b is a flow chart of a method for establishing a VLAN connection according to another embodiment of the present invention.

The process of a method according to another embodiment of the present invention is shown in FIG. 1b, which includes the following steps.

Step S101b: A source node acquires at least one unused VLAN ID and explicit routing information, registers a VLAN ID by using the at least one unused VLAN ID, and sends a first signaling message. The first signaling message includes the at least one unused VLAN ID and the explicit routing information, and the signaling flows through nodes according to the explicit routing information.

Step S102b: At least one intermediate node receives the first signaling message, registers a VLAN ID by using the at least one unused VLAN ID in the first signaling message, and sends the first signaling message according to the explicit routing information in the first signaling message.

Step S103b: A sink node receives the first signaling message, and registers a VLAN ID by using the at least one unused VLAN ID in the first signaling message.

The technical solution according to the embodiment of the present invention is capable of performing automatic VLAN configuration in an environment without a spanning tree protocol.

Figure 1C:
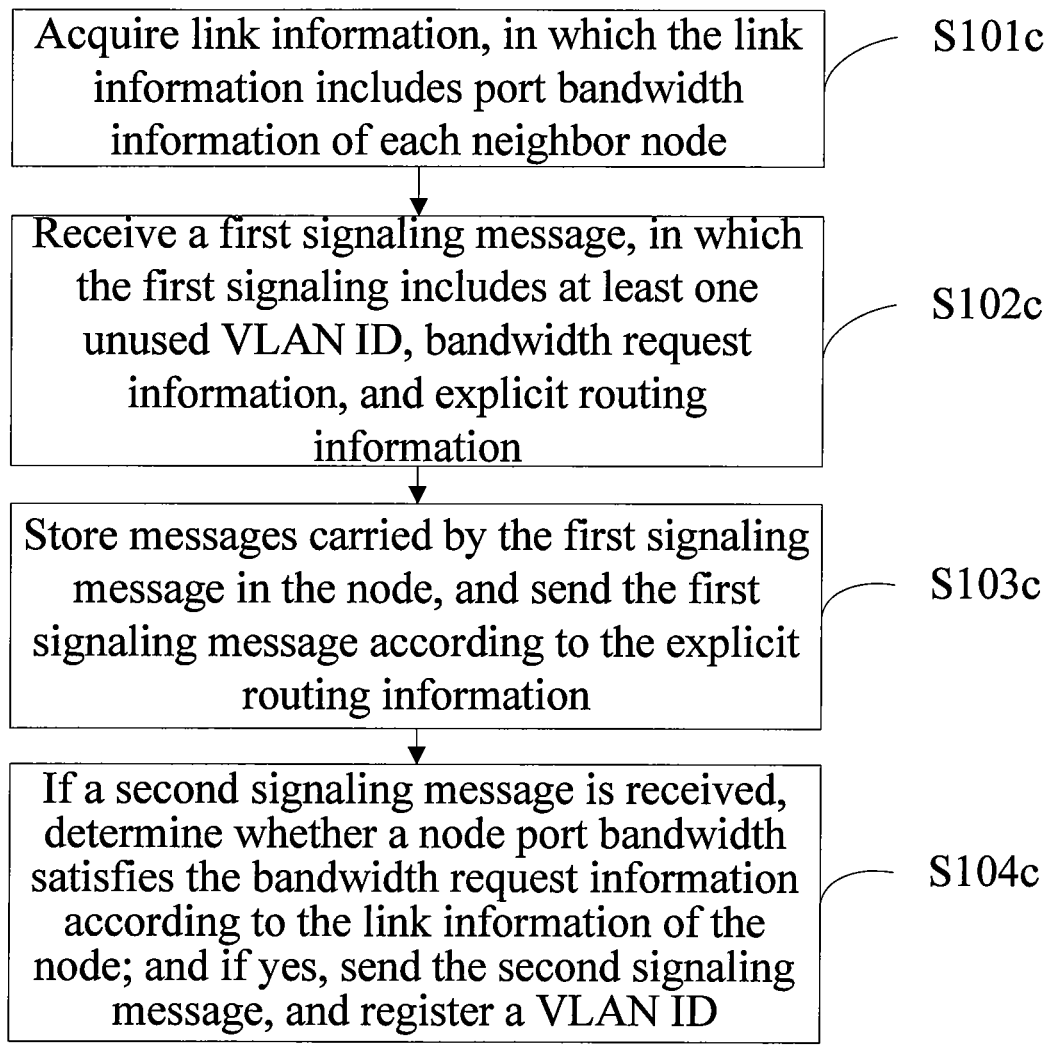
FIG. 1c is a flow chart of a method for establishing a VLAN connection according to yet another embodiment of the present invention.

In yet another embodiment, a step of traffic engineering determination is added based on the preceding two embodiments, and the flow of the method is shown in FIG. 1c, which includes the following steps.

Step S101c: Acquire link information, in which the link information includes port bandwidth information of each neighbor node.

Step S102c: Receive a first signaling message, in which the first signaling message includes at least one unused VLAN ID, bandwidth request information, and explicit routing information.

The first signaling message may be a Path message.

Step S103c: Store the message carried by the first signaling message in the node, and send the first signaling message according to the explicit routing information.

Specifically, the at least one unused VLAN ID, the bandwidth request information, and the explicit routing information in the Path message are stored in the node.

Step S104c: If a second signaling message is received, and the second signaling message is a feedback signal sent by the first signaling message according to the explicit routing information, determine whether node port bandwidth satisfies the bandwidth request information according to the link information of the node; and if yes, send the second signaling message, and register a VLAN ID.

Specifically, the second signaling message may be a Resv message.

Furthermore, after the VLAN ID is registered, the amount of requested bandwidth is subtracted from the node port bandwidth.

In this embodiment, when a point-to-point VLAN connection is established, the first signaling message may further include bi-directional indication information, in which the bi-directional indication information indicates that a same VLAN ID is used in both forward and backward directions; and the registering the VLAN ID is registering a VLAN ID and performing an operation according to the bi-directional indication information.

In this embodiment, when a point-to-point VLAN connection is established, the first signaling message may further include an instruction for disabling a learning function, in which the instruction for disabling a learning function indicates that nodes receiving the first signaling message are forbidden to learn within the VLAN.

The registering the VLAN ID is registering a VLAN ID and performing the instruction for disabling a learning function.

In this embodiment, when a point-to-multipoint VLAN connection is established, the first signaling message including the at least one unused VLAN ID includes that: the first signaling message includes an uplink VLAN ID and a downlink VLAN ID; and the registering the VLAN ID includes that: the uplink VLAN ID is registered at an uplink port and the downlink VLAN ID is registered at a downlink port.

In this embodiment, when a point-to-multipoint VLAN connection is established, the first signaling message may further include an instruction for sharing learning, in which the instruction for sharing learning indicates that an uplink VLAN and a downlink VLAN are set to make them become a mode of sharing learning.

The registering the VLAN ID may further include: performing the instruction for sharing learning.

In this embodiment, when a multipoint-to-multipoint VLAN connection is established, the first signaling message may further include bi-directional indication information, in which the bi-directional indication information indicates that the same VLAN ID is used in both forward and backward directions; and the registering the VLAN ID is registering a VLAN ID, and performing an operation according to the bi-directional indication information.

In this embodiment, when a multipoint-to-multipoint VLAN connection is established, the first signaling message may further include an instruction for enabling a learning function, in which the instruction for enabling a learning function indicates to enable a learning function within the VLAN.

The registering the VLAN ID is registering a VLAN ID and performing the instruction for enabling a learning function.

The technical solution according to the embodiment of the present invention is capable of performing automatic VLAN configuration in an environment without a spanning tree protocol, and supporting traffic engineering simultaneously.

Figure 1D:
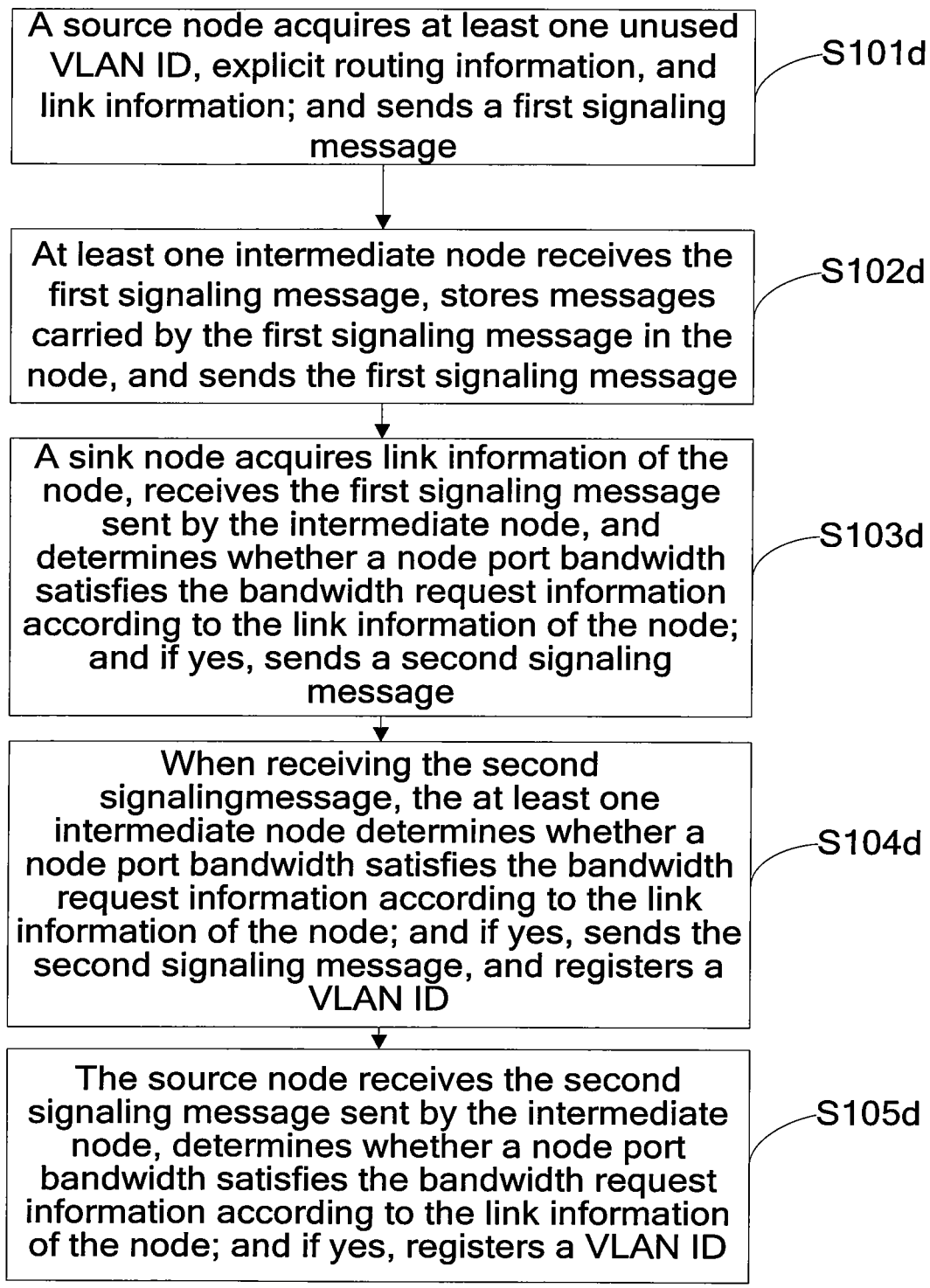
FIG. 1d is a flow chart of a method for establishing a VLAN connection according to still another embodiment of the present invention.

In still another embodiment, a step of traffic engineering determination is added based on the preceding two embodiments, and the flow of the method is shown in FIG. 1d, which includes the following steps.

Step S101d: A source node acquires at least one unused VLAN ID, explicit routing information, and link information; and sends a first signaling message, in which the first signaling message includes the at least one unused VLAN ID, the bandwidth request information, and the explicit routing information.

Step S102d: At least one intermediate node receives the first signaling message, stores a message carried by the first signaling message in the node, and sends the first signaling message.

The first signaling message may be a Path message.

Step S103d: A sink node acquires link information of the node, receives the first signaling message sent by the intermediate node, and determines whether node port bandwidth satisfies the bandwidth request information according to the link information of the node; and if yes, sends a second signaling message, in which the second signaling message is a feedback signal sent by the first signaling message according to the explicit routing information, and registers a VLAN ID.

Specifically, the second signaling message may be a Resv message.

Step S104d: When receiving a second signaling message, the at least one intermediate node determines whether the node port bandwidth satisfies the bandwidth request information according to the link information of the node; and if yes, sends the second signaling message, and registers a VLAN ID.

Step S105d: The source node receives the second signaling message sent by the intermediate node, determines whether node port bandwidth satisfies the bandwidth request information according to the link information of the node; and if yes, registers a VLAN ID.

Furthermore, after a VLAN ID in step S103d, step S104d, and step S105d is registered, the amount of requested bandwidth is subtracted from the node port bandwidth.

The technical solution according to the embodiment of the present invention is capable of performing automatic VLAN configuration in an environment without a spanning tree protocol, and supporting traffic engineering simultaneously.

To describe embodiments of the present invention more clearly, hereinafter, the implementation aspects of the present invention are further illustrated in detail with reference to the accompanying drawings and embodiments.

First Embodiment

Figure 2:
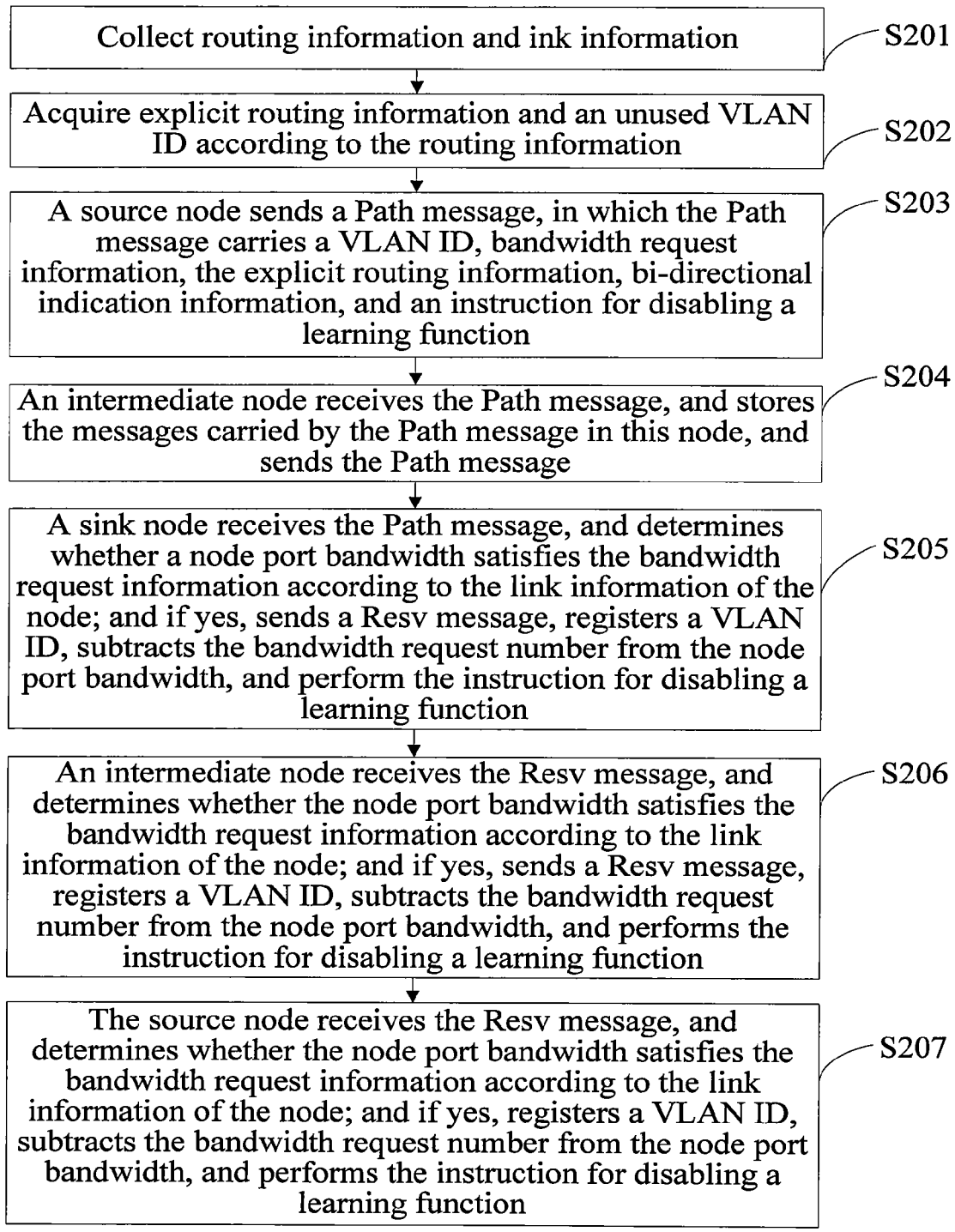
FIG. 2 is a flow chart of a method for establishing a VLAN connection according to a first embodiment of the present invention.
Figure 3:
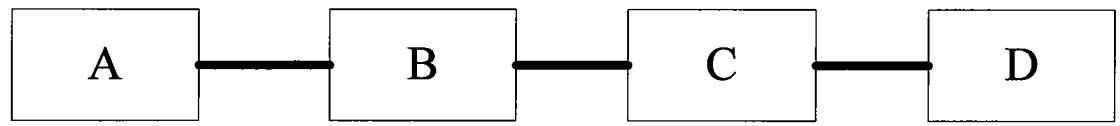
FIG. 3 is a schematic structural diagram of a network according to the first embodiment of the present invention.

FIG. 2 is a flow chart of a method for establishing a VLAN connection according to a first embodiment of the present invention. The method according to this embodiment solves problems of a point-to-point VLAN connection. A structural diagram of a network is shown in FIG. 3. Taking a node A initiating a signaling to establish a point-to-point VLAN tunnel between the node A and a node D as an example, the method includes the following steps.

Step S201: Collect routing information by using a routing protocol, such as, Open Shortest Path First (OSPF) and Intermediate System to Intermediate System (IS-IS); and collect link information for each node by using a Link Layer Discovery Protocol (LLDP) or Link Management Protocol (LMP).

In this embodiment, an OSPF routing protocol is taken as an example. The OSPF routing protocol runs on each node, and information carrying a layer 2 MAC address of a port on each node and information carrying a VLAN ID registered on the port are extended in a Link State Advertisement (LSA) packet spreading in the entire network.

After receiving the LSA packet from nodes receiving the first signaling message, of the network, each node acquires the layer 2 topology of the entire network according to the MAC address information carried in the LSA packet, and maintains a used VLAN ID database or an unused VLAN ID database of the entire network according to the registered VLAN ID information carried in the LSA packet.

In this embodiment, an LLDP protocol is taken as an example to describe the collecting of link information. When an OSPF routing protocol runs on each node, an LLDP packet is sent to a neighbor node, in which the LLDP packet carries port bandwidth information of the neighbor node. After receiving the LLDP packet sent by the neighbor node, each node maintains a bandwidth information database of each link connected to the node according to the port bandwidth information in the LLDP packet.

Step S202: Acquire explicit routing information and an unused VLAN ID according to the routing information.

When receiving a request for establishing connection, the node A calculates route according to the topology information of the node A to acquire the explicit routing information, and selects a currently unused VLAN ID according to the VLAN ID database.

As shown in FIG. 3, the explicit routing information from the node A to the node D is A->B->C->D, and a currently unused VLAN ID is selected, for example, the VLAN ID 5.

Step S203: A source node sends a Path message, in which the Path message carries a VLAN ID, bandwidth request information, explicit routing information, bi-directional indication information, and an instruction for disabling a learning function.

The node A sends a Path message according to the explicit routing information, in which the Path message carries a VLAN ID, bandwidth request information, explicit routing information, bi-directional indication information, and an instruction for disabling a learning function. The bi-directional indication information indicates that a same VLAN ID is used in both forward and backward directions, that is, the VLAN ID of A->B->C->D is 5, and the VLAN ID of D->C->B->A is also 5. Providing the instruction for disabling a learning function in the signaling means that the nodes receiving the first signaling message are forbidden to learn within the VLAN.

Step S204: An intermediate node receives the Path message, and stores the message carried by the Path message in the node, and sends the Path message.

When the Path message passes through each intermediate node, each intermediate node stores various information carried by the Path message in the node, and forwards the Path message to a next node.

Step S205: A sink node receives the Path message, and determines whether node port bandwidth satisfies the bandwidth request information according to the link information of the node. If the node port bandwidth satisfies the bandwidth request information, the sink node sends a Resv message, registers a VLAN ID, subtracts the amount of requested bandwidth from the node port bandwidth, and performs the instruction for disabling a learning function.

After receiving the Path message, the node D determines whether the node port bandwidth satisfies the bandwidth request. If the node port bandwidth satisfies the bandwidth request, the node D sends a Resv message to the node C, and registers a VLAN ID on a port where the Path message is received and the Resv message is sent, disables the learning function within the VLAN according to the instruction for disabling a learning function in the signaling, and subtracts the amount of requested bandwidth from the node port bandwidth. If the node port bandwidth does not satisfy the bandwidth request, the node D returns a PathErr message to the node A.

Step S206: An intermediate node receives the Resv message, and determines whether the node port bandwidth satisfies the bandwidth request information according to the link information of the node. If the node port bandwidth satisfies the bandwidth request information, the intermediate node sends a Resv message, registers a VLAN ID, subtracts the amount of requested bandwidth from the node port bandwidth, and performs the instruction for disabling a learning function.

After receiving the Resv message, the node C checks whether the node port bandwidth satisfies the bandwidth request. If the node port bandwidth satisfies the bandwidth request, the node C registers a VLAN ID on two ports where the Path message and the Resv message are received, disables the learning function within the VLAN according to the instruction for disabling a learning function in the signaling, subtracts the amount of requested bandwidth from the node port bandwidth, and sends the Resv message to the node B If the node port bandwidth does not satisfy the bandwidth request, the node C returns a PathErr message to the node A, and returns a ResvErr message to the node D. The above operations are repeated, till the node A receives the message.

Step S207: The source node receives the Resv message, and determines whether the node port bandwidth satisfies the bandwidth request information according to the link information of the node. If the node port bandwidth satisfies the bandwidth request information, the source node registers a VLAN ID, subtracts the amount of requested bandwidth from the node port bandwidth, and performs the instruction for disabling a learning function.

After receiving the Resv message sent by the node B, the node A checks whether the node port bandwidth satisfies the bandwidth request. If the node port bandwidth satisfies the bandwidth request, the node A registers a VLAN ID on two ports where the Path message and the Resv message are received, disables the learning function within the VLAN according to the instruction for disabling a learning function in the signaling, and subtracts the amount of requested bandwidth from the node port bandwidth.

In step S201, collecting routing information and collecting link information for each node have no strict sequence relation.

The technical solution according to the embodiment of the present invention is capable of performing automatic VLAN configuration in an environment without a spanning tree protocol, and supporting traffic engineering simultaneously.

Second Embodiment

Figure 4:
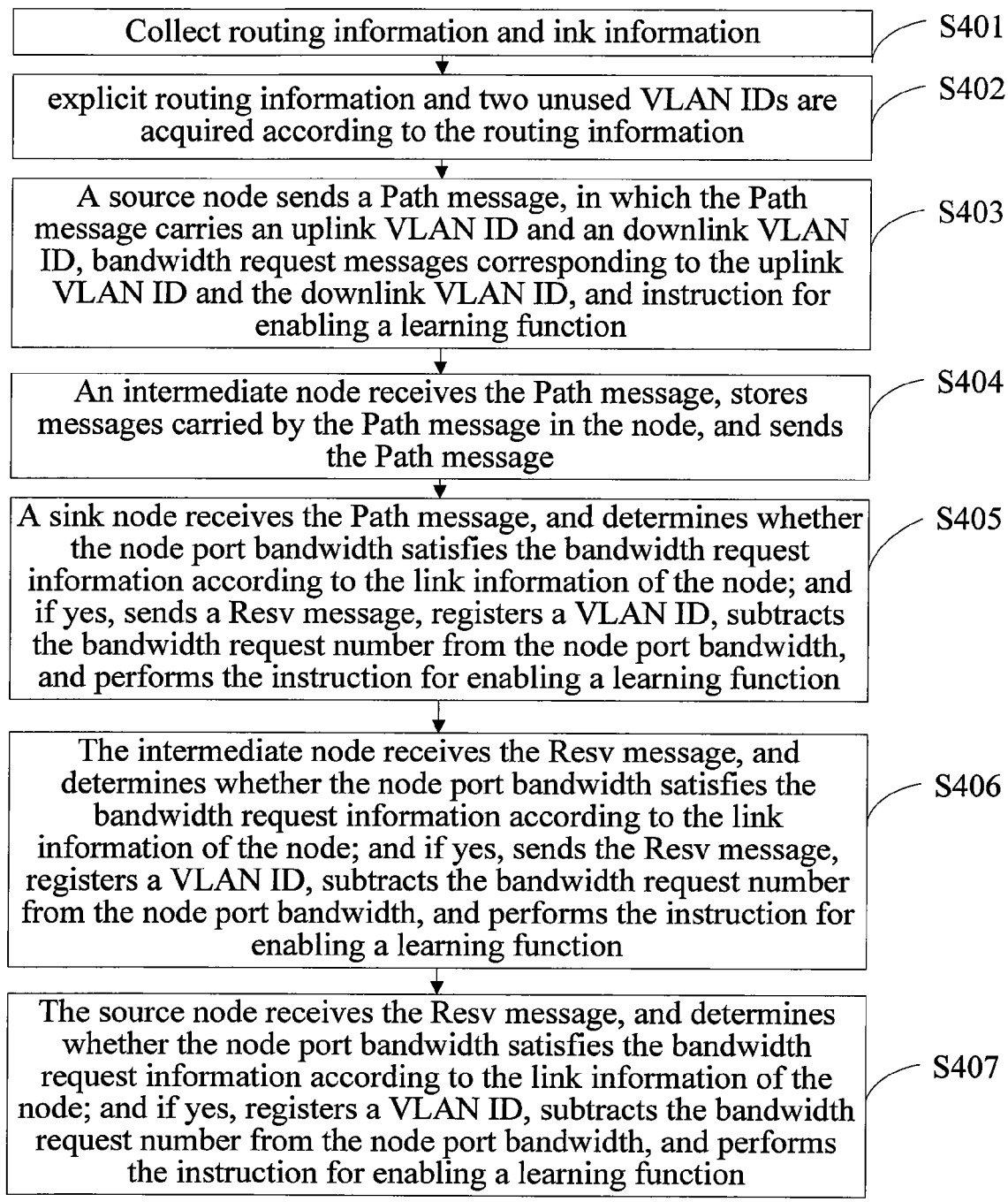
FIG. 4 is a flow chart of a method for establishing a VLAN connection according to a second embodiment of the present invention.
Figure 5:
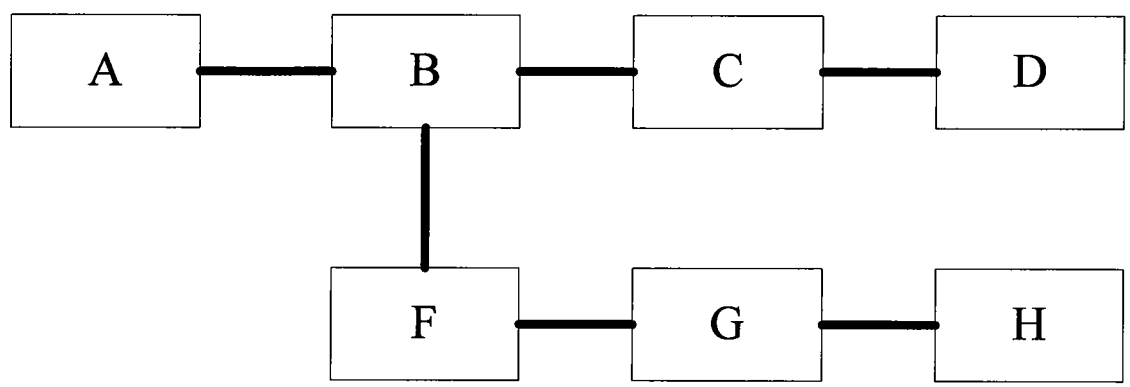
FIG. 5 is a schematic structural diagram of a network according to the second embodiment.

FIG. 4 is a flow chart of a method for establishing a VLAN connection according to a second embodiment. The method according to this embodiment solves problems of a point-to-multipoint asymmetric VLAN connection. A structural diagram of a network is shown in FIG. 5. Taking a node A initiating a signaling to establish a point-to-multipoint asymmetric VLAN tunnel between the node A and a node D and from a node A to a node H as an example, the method includes the following steps.

Step S401: Collect routing information by using a routing protocol, such as Open Shortest Path First (OSPF) and Intermediate System to Intermediate System (IS-IS); and collect link information for each node by using a Link Layer Discovery Protocol (LLDP) or Link Management Protocol (LMP).

In this embodiment, an OSPF routing protocol is taken as an example. The OSPF routing protocol runs on each node, and information carrying a layer 2 MAC address of a port on each node and information carrying a VLAN ID registered on the port are extended in a Link State Advertisement (LSA) packet spreading in the entire network.

After receiving the LSA packet from nodes receiving the first signaling message, of the network, each node acquires the layer 2 topology of the entire network according to the MAC address information carried in the LSA packet, and maintains a used VLAN ID database or an unused VLAN ID database of the entire network according to the registered VLAN ID information carried in the LSA packet.

In this embodiment, an LLDP protocol is taken as an example to describe the collecting of link information. When an OSPF routing protocol runs on each node, an LLDP packet is sent to a neighbor node, in which the LLDP packet carries port bandwidth information of the neighbor node. After receiving the LLDP packet sent by the neighbor node, each node maintains a bandwidth information database of each link connected to the node according to the port bandwidth information in the LLDP packet.

Step S402: Acquire explicit routing information and two unused VLAN IDs according to the routing information.

When receiving a request for establishing connection, the node A calculates route according to the topology information of the node A to acquire the explicit routing information, and selects a currently unused VLAN ID according to the VLAN ID database.

As shown in FIG. 5, the explicit routing information from the node A to the node D is A->B->C->D, the explicit routing information from the node A to the node H is A->B->F->G->H, and two currently unused VLAN IDs are selected to serve as an uplink VLAN ID and a downlink VLAN ID, for example the uplink VLAN ID 5 and the downlink VLAN ID 6.

Step S403: A source node sends a Path message, in which the Path message carries the uplink VLAN ID and the downlink VLAN ID, bandwidth request messages that are corresponding to the uplink VLAN ID and the downlink VLAN ID, and an instruction for sharing learning.

The node A sends the Path message according to the explicit routing information, in which the Path message carries the uplink VLAN ID and the downlink VLAN ID, uplink bandwidth request information and a downlink bandwidth request information that are corresponding to the uplink VLAN ID and the downlink VLAN ID, explicit routing information, and an instruction for sharing learning. The instruction for sharing learning indicates that the two VLANs are set to make them become a mode of sharing learning.

Step S404: An intermediate node receives the Path message, stores the message carried by the Path message in the node, and sends the Path message.

When the Path message passes through each intermediate node, each intermediate node stores various information carried in the Path message in the node.

Step S405: A sink node receives the Path message, and determines whether the node port bandwidth satisfies the bandwidth request information according to the link information of the node. If the node port bandwidth satisfies the bandwidth request information, the sink node sends a Resv message, registers a VLAN ID, subtracts the amount of requested bandwidth from the node port bandwidth, and performs the instruction for sharing learning.

For example, after receiving the Path message, the node D determines whether the node port bandwidth satisfies the bandwidth request. If the node port bandwidth satisfies the bandwidth request, the node D sends a Resv message to the node C, registers the uplink VLAN ID on a port where the Path message is received, registers the downlink VLAN ID on a port where the Resv message is sent, sets the uplink VLAN and the downlink VLAN to make them become a mode of sharing learning according to the instruction for sharing learning carried in the signaling, and subtracts the amount of requested bandwidth from the node port bandwidth. If the node port bandwidth does not satisfy the bandwidth request, the node D returns a PathErr message to the node A.

Step S406: An intermediate node receives the Resv message, and determines whether the node port bandwidth satisfies the bandwidth request information according to the link information of the node. If the node port bandwidth satisfies the bandwidth request information, the intermediate node sends the Resv message, registers a VLAN ID, subtracts the amount of requested bandwidth from the node port bandwidth, and performs the instruction for sharing learning.

After receiving the Resv message, the node C checks whether the node port bandwidth satisfies uplink and downlink bandwidth requests. If the node port bandwidth satisfies the uplink and downlink bandwidth requests, the node C registers the uplink VLAN ID on the uplink port and registers the downlink VLAN ID on the downlink port, sets the uplink VLAN and the downlink VLAN to make them become the mode of sharing learning according to the instruction for sharing learning carried in the signaling, subtracts the amount of requested downlink bandwidth from the node port bandwidth, and sends the Resv message to the node B. If the node port bandwidth does not satisfy the uplink and downlink bandwidth requests, the node C returns a PathErr message to the node A, and returns a ResvErr message to the node D. The above operations are repeated till the node A receives the message, which is applicable to the node H to the node A.

Step S407: The source node receives the Resv message, and determines whether the node port bandwidth satisfies the bandwidth request information according to the link information of the node. If the node port bandwidth satisfies the bandwidth request information, the source node registers a VLAN ID, subtracts the amount of requested bandwidth from the node port bandwidth, and performs the instruction for sharing learning.

The node A receives the Resv message sent by the node B, and checks whether the node port bandwidth satisfies the bandwidth request. If the node port bandwidth satisfies the bandwidth request, the node A registers the uplink VLAN ID on the uplink port and registers the downlink VLAN ID on the downlink port, sets the uplink VLAN and the downlink VLAN to make them become the mode of sharing learning according to the instruction for sharing learning carried in the signaling, and subtracts the amount of requested downlink bandwidth from the node port bandwidth.

In step S401, collecting routing information and collecting link information for each node have no strict sequence relation.

The technical solution according to the embodiment of the present invention is capable of performing automatic VLAN configuration in an environment without a spanning tree protocol, and supporting traffic engineering simultaneously.

Third Embodiment

Figure 6:
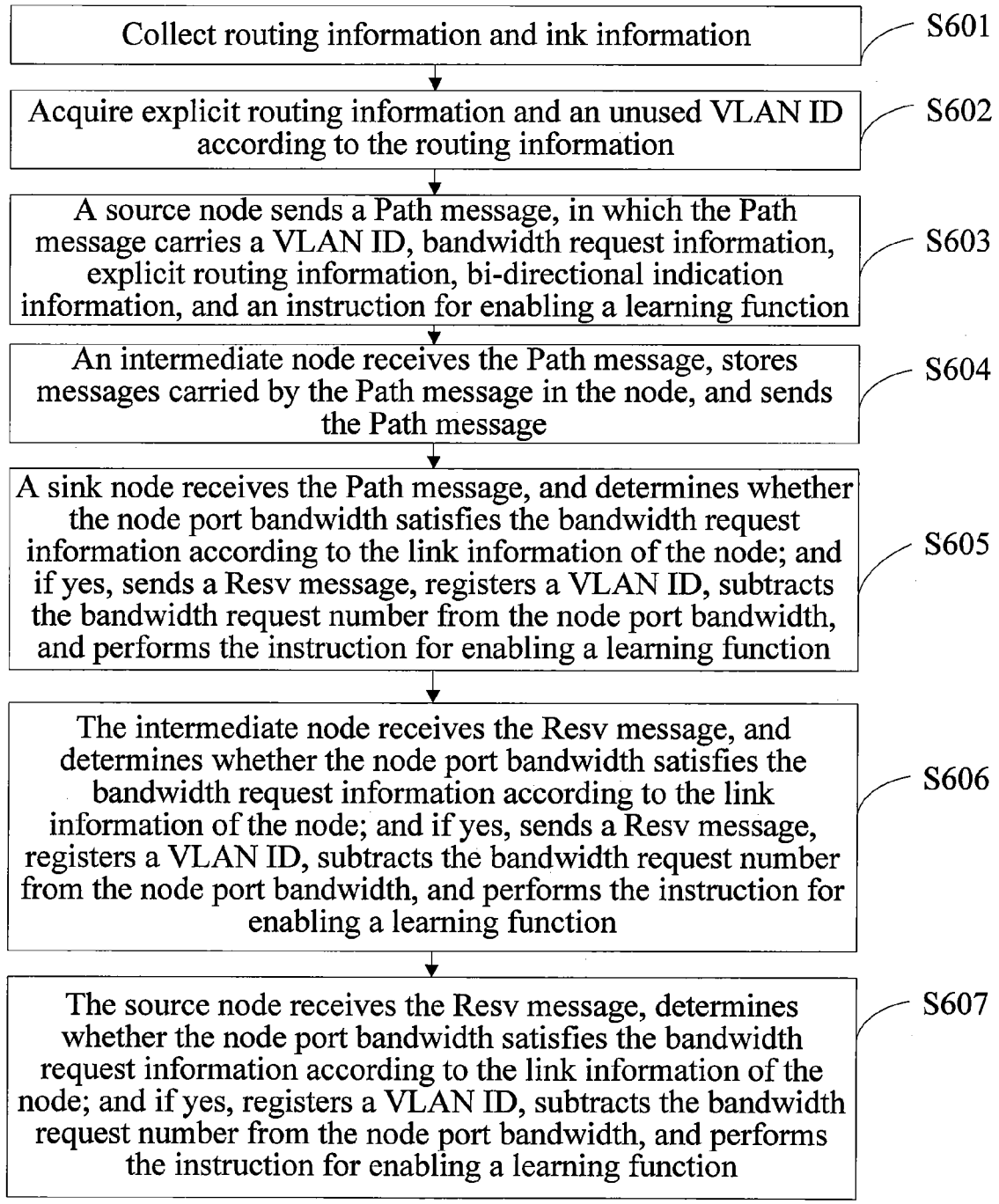
FIG. 6 is a flow chart of a method for establishing a VLAN connection according to a third embodiment of the present invention.
Figure 7:
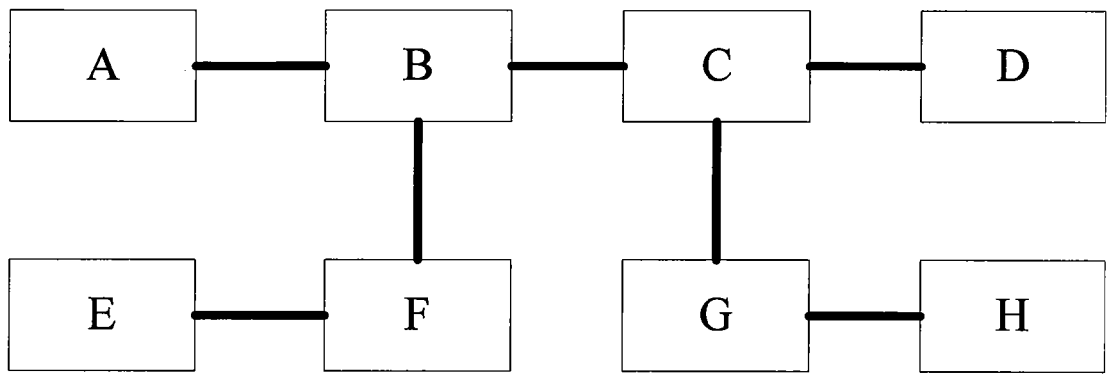
FIG. 7 is a schematic structural diagram of a network according to the third embodiment of the present invention.

FIG. 6 is a flow chart of a method for establishing a VLAN connection according to a third embodiment of the present invention. The method according to this embodiment solves problems of a multipoint-to-multipoint asymmetric VLAN connection. A structural diagram of a network is shown in FIG. 7. Taking a node A initiating a signaling to establish a multipoint-to-multipoint VLAN tunnel as an example, the method includes the following steps.

Step S601: Collect routing information by using a routing protocol, such as, Open Shortest Path First (OSPF) and Intermediate System to Intermediate System (IS-IS); and collect link information for each node by using a Link Layer Discovery Protocol (LLDP) or Link Management Protocol (LMP).

In this embodiment, an OSPF routing protocol is taken as an example. The OSPF routing protocol runs on each node, and information carrying a layer 2 MAC address of a port on each node and information carrying a VLAN ID registered on the port are extended in a Link State Advertisement (LSA) packet spreading in the entire network.

After receiving the LSA packet from nodes receiving the first signaling message, of the network, each node acquires the layer 2 topology of the entire network according to the MAC address information carried in the LSA packet, and maintains a used VLAN ID database or an unused VLAN ID database of the entire network according to the registered VLAN ID information carried in the LSA packet.

In this embodiment, an LLDP protocol is taken as an example to describe the collecting of link information. When an OSPF routing protocol runs on each node, an LLDP packet is sent to a neighbor node, in which the LLDP packet carries port bandwidth information of the neighbor node. After receiving the LLDP packet sent by the neighbor node, each node maintains a bandwidth information database of each link connected to the node according to the port bandwidth information in the LLDP packet.

Step S602: Acquire explicit routing information and an unused VLAN ID according to the routing information.

When receiving a request for establishing connection, the node A calculates a spanning tree according to the routing information of the node A to serve as a multipoint-to-multipoint connection topology, acquires the explicit routing information, and selects a currently unused VLAN ID according to the VLAN ID database.

Step S603: A source node sends a Path message, in which the Path message carries a VLAN ID, bandwidth request information, explicit routing information, bi-directional indication information, and an instruction for enabling a learning function.

The node A sends point-to-multipoint Path message according to the explicit routing information, in which the point-to-multipoint Path message carries a VLAN ID, the bandwidth request information, the explicit routing information, the bi-directional indication information, and an instruction for enabling a learning function. The bi-directional indication information indicates that a same VLAN ID is used in both forward and backward directions. Providing the instruction for enabling a learning function in the signaling indicates that a learning function within the VLAN is enabled.

Step S604: An intermediate node receives the Path message, stores a message carried by the Path message in the node, and sends the Path message.

When the Path message passes through each intermediate node, each intermediate node stores various information carried in the Path message in the node.

Step S605: A sink node receives the Path message, and determines whether the node port bandwidth satisfies the bandwidth request information according to the link information of the node. If the node port bandwidth satisfies the bandwidth request information, the sink node sends a Resv message, registers a VLAN ID, subtracts the amount of requested bandwidth from the node port bandwidth, and performs the instruction for enabling a learning function.

For example, after receiving the Path message, the node D determines whether the node port bandwidth satisfies the bandwidth request. If the node port bandwidth satisfies the bandwidth request, the node D sends a Resv message to the node C, registers a VLAN ID on ports where the Path message is received and the Resv message is sent, enables the learning function within the VLAN according to the instruction for enabling a learning function carried in the signaling, and subtracts the amount of requested bandwidth from the node port bandwidth. If the node port bandwidth does not satisfy the bandwidth request, the node D returns a PathErr message to the node A.

Step S606: An intermediate node receives the Resv message, and determines whether the node port bandwidth satisfies the bandwidth request information according to the link information of the node. If the node port bandwidth satisfies the bandwidth request information, the intermediate node sends a Resv message, registers a VLAN ID, subtracts the amount of requested bandwidth from the node port bandwidth, and performs the instruction for enabling a learning function.

After receiving the Resv message, the node C checks whether the node port bandwidth satisfies the bandwidth request. If the node port bandwidth satisfies the bandwidth request, the node C registers a VLAN ID on two ports where the Path message and the Resv message are received, enables the learning function within the VLAN according to the instruction for enabling a learning function carried in the signaling, subtracts the amount of requested uplink bandwidth and requested downlink bandwidth from the port bandwidth, and sends the Resv message to the node B. If the node port bandwidth does not satisfy the bandwidth request, the node C returns a PathErr message to the node A, and returns a ResvErr message to the node D. The above operations are repeated till the node A receives the message, which is applicable to the node H to the node A, and the node E to the node A.

Step S607: The source node receives the Resv message, determines whether the node port bandwidth satisfies the bandwidth request information according to the link information of the node. If the node port bandwidth satisfies the bandwidth request information, the source node registers a VLAN ID, subtracts the amount of requested bandwidth from the node port bandwidth, and performs the instruction for enabling a learning function.

The node A receives the Resv message sent by the node B, checks whether the node port bandwidth satisfies the bandwidth request. If the node port bandwidth satisfies the bandwidth request, the node A registers a VLAN ID on two ports where the Path message and the Resv message are received, enables the learning function within the VLAN according to the instruction for enabling a learning function carried in the signaling, and subtracts the amount of requested uplink bandwidth and requested downlink bandwidth from the port bandwidth.

In step S601, collecting routing information and collecting link information for each node have no strict sequence relation.

The technical solution according to the embodiment of the present invention is capable of performing automatic VLAN configuration in an environment without a spanning tree protocol, and supporting traffic engineering simultaneously.

Fourth Embodiment

Figure 8:
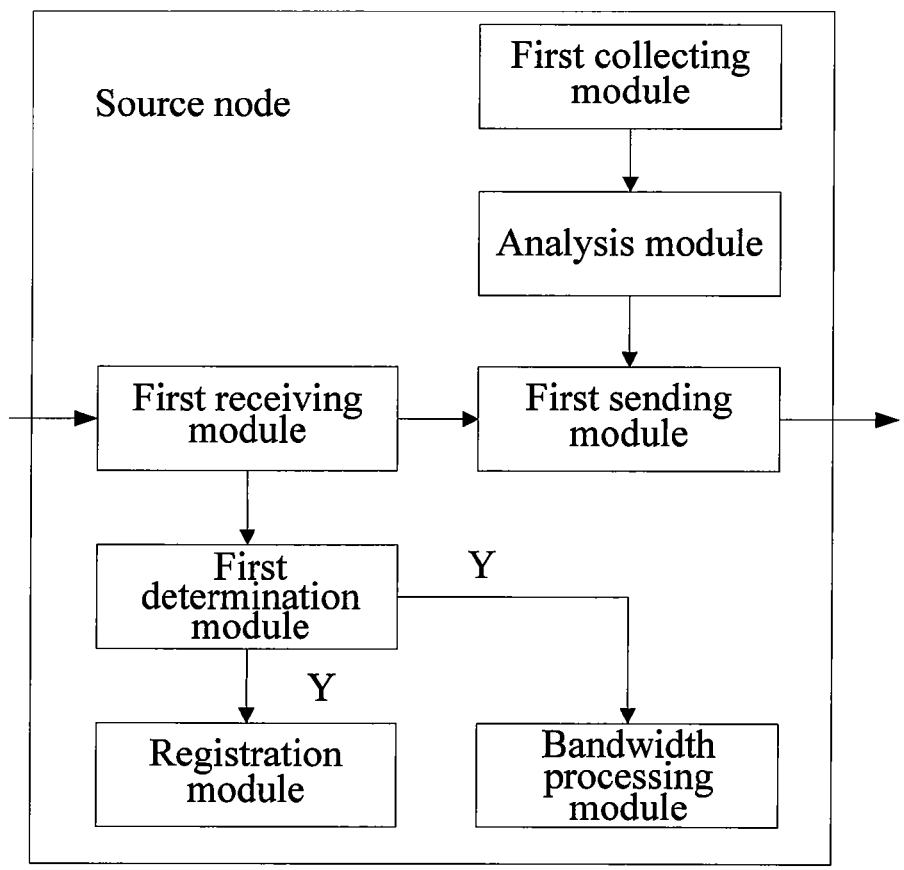
FIG. 8 is a schematic structural diagram of a node apparatus according to a fourth embodiment of the present invention.

In the fourth embodiment, a source node apparatus is provided. As shown in FIG. 8, the source node apparatus includes a first collecting module, an analysis module, a first receiving module, and a first sending module.

The first collecting module is configured to collect routing information and link information, in which the routing information includes a network topology and an updated network VLAN ID database, and the link information includes port bandwidth information of each neighbor node.

The analysis module is configured to acquire explicit routing information and at least one unused VLAN ID from the routing information sent by the collecting module.

The first receiving module is configured to receive bandwidth request information.

The first sending module is configured to send a first signaling message, in which the first signaling message includes the VLAN ID, the bandwidth request information, and the explicit routing information.

In practice, the first signaling message may be a Path message.

Furthermore, the source node apparatus may further include a first determination module, a registration module, and a bandwidth processing module.

The first receiving module is further configured to receive a second signaling message, in which the second signaling message is a feedback signal sent by the first signaling message according to the explicit routing information.

In practice, the second signaling message may be a Resv message.

The first determination module is configured to determine whether the acquired port bandwidth information acquired according to the link information satisfies the bandwidth request information; and if yes, send a VLAN ID to the registration module.

The registration module is configured to register a VLAN ID on a port.

Furthermore, the node apparatus includes:

The bandwidth processing module is configured to receive the port bandwidth information and the bandwidth request information sent by the first determination module, and subtract the amount of requested bandwidth from the node port bandwidth.

Fifth Embodiment

Figure 9:
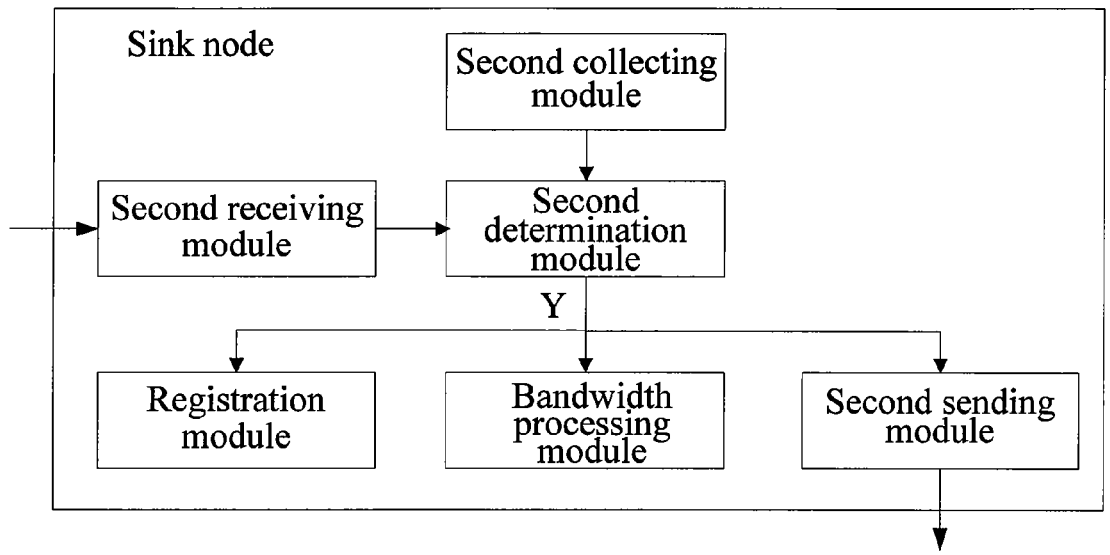
FIG. 9 is a schematic structural diagram of a node apparatus according to a fifth embodiment of the present invention.

The fifth embodiment of the present invention provides a sink node apparatus. As shown in FIG. 9, the sink node apparatus includes a second collecting module, a second receiving module, a second determination module, a registration module, and a second sending module.

The second collecting module is configured to collect link information, in which the link information includes port bandwidth information of each neighbor node.

The second receiving module is configured to receive a first signaling message, in which the first signaling message includes a VLAN ID, bandwidth request information, and explicit routing information.

In practice, the first signaling message may be a Path message.

The second determination module is configured to determine whether the port bandwidth information acquired according to the link information satisfies the bandwidth request information; and if yes, send a VLAN ID to the registration module, and send a second signaling message to the second sending module, in which the second signaling message is a feedback signal sent by the first signaling message according to the explicit routing information.

In practice, the second signaling message may be a Resv message.

The registration module is configured to register a VLAN ID on a port.

The second sending module is configured to send the second signaling message.

Furthermore, the node apparatus includes a bandwidth processing module.

The bandwidth processing module is configured to receive the port bandwidth information and the bandwidth request information sent by the second determination module, and subtract the amount of requested bandwidth from the node port bandwidth.

Sixth Embodiment

Figure 10:
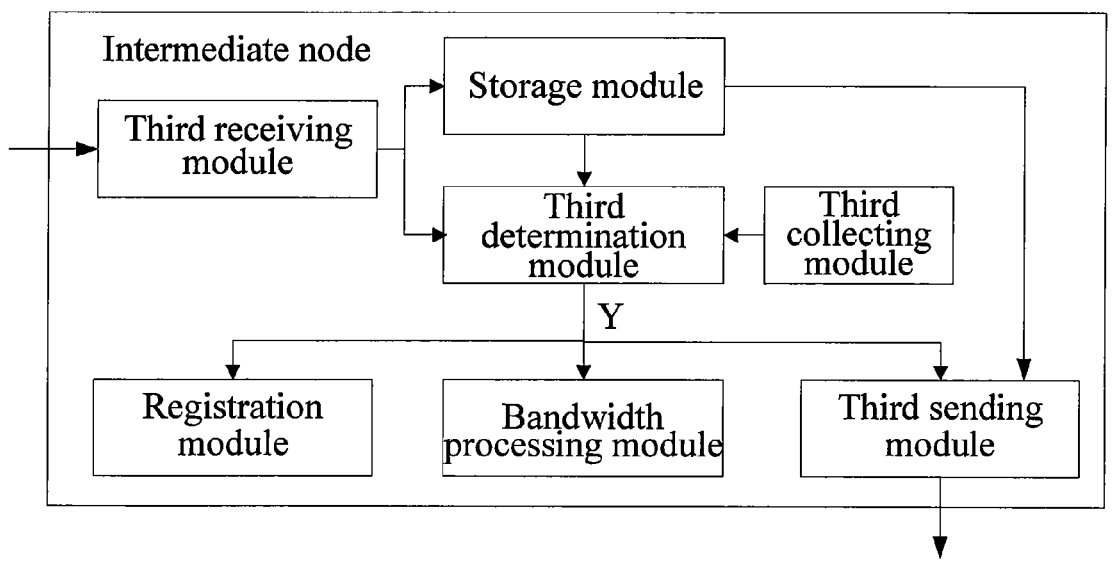
FIG. 10 is a schematic structural diagram of a node apparatus according to a sixth embodiment of the present invention.

The sixth embodiment of the present invention provides an intermediate node apparatus. As shown in FIG. 10, the intermediate node apparatus includes a third receiving module, a storage module, a third collecting module, a third determination module, a registration module, and a third sending module.

The third receiving module is configured to receive a first signaling message or a second signaling message, in which the first signaling message includes at least one unused VLAN ID, bandwidth request information, and explicit routing information, and the second signaling message is a feedback signal sent by the first signaling message according to the explicit routing information; send the first signaling message to the storage module when receiving the first signaling message; and send the second signaling message to the third determination module when receiving the second signaling message.

The storage module is configured to store various information in the first signaling message, in which the first signaling message includes a VLAN ID, the bandwidth request information, and the explicit routing information; and send the first signaling message to the third sending module and the third determination module.

The third collecting module is configured to collect link information, in which the link information includes port bandwidth information of each neighbor node.

The third determination module is configured to receive the link information and the first signaling message, and determine whether the port bandwidth information acquired according to the link information satisfies the bandwidth request information; and if yes, send a VLAN ID to the registration module, and send the second signaling message to the third sending module.

The registration module is configured to register a VLAN ID on a port.

The third sending module is configured to send the first signaling message or the second signaling message.

In practice, the first signaling message maybe a Path message, and the second signaling message may be a Resv message.

Furthermore, the node apparatus includes a bandwidth processing module.

The bandwidth processing module is configured to receive the port bandwidth information and the bandwidth request information that are sent by the third determination module, and subtract the amount of requested bandwidth from the node port bandwidth.

The technical solution according to the embodiment of the present invention has the following advantage: automatic VLAN configuration can be performed in an environment without a spanning tree protocol, and traffic engineering is supported simultaneously.

Seventh Embodiment

Figure 11:
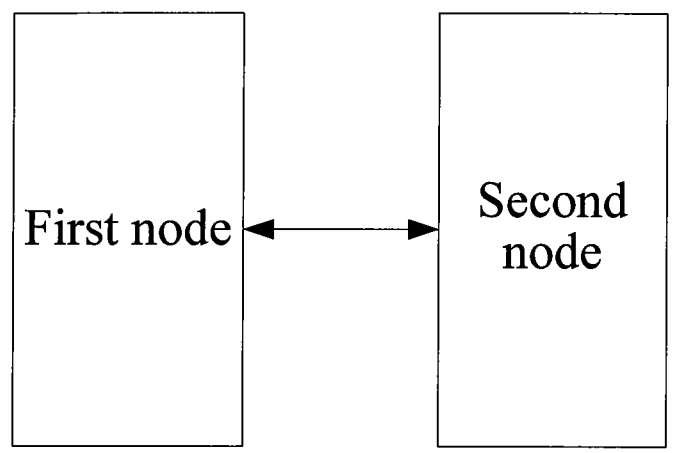
FIG. 11 is a schematic view of a network system for establishing a VLAN connection according to a seventh embodiment of the present invention.

The seventh embodiment of the present invention provides a network system for establishing a VLAN connection, as shown in FIG. 11, which includes a first node and a second node.

The first node is configured to collect routing information and link information, in which the routing information includes a network topology and an updated network VLAN ID database, and the link information includes port bandwidth information of each neighbor node; acquire explicit routing information and at least one unused VLAN ID according to the routing information; and send a first signaling message, in which the first signaling message includes a VLAN ID, bandwidth request information, and the explicit routing information.

The second node is configured to collect link information, in which the link information includes port bandwidth information of each neighbor node; receive the first signaling message, and determine whether the node port bandwidth information acquired according to the link information satisfies the bandwidth request information; and if yes, register a VLAN ID, send a second signaling message, in which the second signaling message is a feedback signal sent by the first signaling message according to the explicit routing information.

Furthermore, after the VLAN ID is registered, the amount of requested bandwidth is subtracted from the node port bandwidth.

The first node is further configured to determine whether the node port bandwidth satisfies the bandwidth request information according to the link information of the node when receiving the second signaling message; and if yes, register a VLAN ID.

Furthermore, after the VLAN ID is registered, the amount of requested bandwidth is subtracted from the node port bandwidth.

The network system may further include a third node between the first node and the second node.

The third node is configured to receive the first signaling message, and store information in the first signaling message and then send the first signaling message; and further configured to collect link information, in which the link information includes port bandwidth information of each neighbor node; determine whether the port bandwidth information acquired according to the link information satisfies the bandwidth request information included in the first signaling message when receiving the second signaling message; and if yes, register a VLAN ID, and send the second signaling message.

Furthermore, after the VLAN ID is registered, the amount of requested bandwidth is subtracted from the node port bandwidth.

In practice, the first signaling message may be a Path message, and the second signaling message may be a Resv message.

Eighth Embodiment

The eighth embodiment of the present invention provides another node apparatus, which includes a receiving module, a registration module, and a sending module.

The receiving module is configured to receive a first signaling message, in which the first signaling message includes at least one unused VLAN ID and explicit routing information.

The registration module is configured to register a VLAN ID by using the at least one unused VLAN ID.

The sending module is configured to send the first signaling message according to the explicit routing information.

Ninth Embodiment

The ninth embodiment of the present invention provides a network system for establishing a VLAN connection, which includes a source node, at least one intermediate node, and a sink node.

The source node is configured to acquire at least one unused VLAN ID and explicit routing information; register a VLAN ID by using the at least one unused VLAN ID; and send a first signaling message, in which the first signaling message includes the at least one unused VLAN ID and the explicit routing information, and the signaling flows through each node according to the explicit routing information.

The at least one intermediate node is configured to receive the first signaling message; register a VLAN ID by using the at least one unused VLAN ID in the first signaling message; and send the first signaling message according to the explicit routing information in the first signaling message.

The sink node is configured to receive the first signaling message; and register a VLAN ID by using the at least one unused VLAN ID in the first signaling message.

The content of signal processing and process executing between the system modules are based on the same conception as the method embodiments of the present invention, reference may be made to the description in the first embodiment of the present invention, and therefore the content is not repeated herein.

The technical solution according to the embodiment of the present invention has the following advantage: automatic VLAN configuration may be performed in an environment without a spanning tree protocol, and traffic engineering is supported simultaneously.

Exemplary embodiments of the present invention are described. It should be noted by persons of ordinary skill in the art that modifications and variations may be made without departing from the principle of the present invention, which should be construed as falling within the protection scope of the present invention.

What is claimed is:

1. A method for establishing a Virtual Local Area Network (VLAN) connection, comprising:
    receiving, by an intermediate node, a first signaling message, wherein the first signaling message comprises an VLAN ID, explicit routing information and bandwidth request information;
    sending, by the intermediate node, the first signaling message according to the explicit routing information;
    receiving, by the intermediate node, a second signaling message responsive to the first signaling message;
    determining, by the intermediate node, whether a bandwidth of a port on the intermediate node satisfies the bandwidth request information contained in the first signaling message after the second signaling message is received; and
    registering, by the intermediate node, the VLAN ID with the intermediate node upon determining that the bandwidth of a port on the intermediate node satisfies the bandwidth request information in the first signaling message.

2. The method for establishing a VLAN connection according to claim 1, wherein
    when a point-to-point VLAN connection is established, the first signaling message further comprises bi-directional indication information, wherein the bi-directional indication information indicates that a same VLAN ID is used in both forward and backward directions; and the registering the VLAN ID comprises registering the VLAN ID, and performing an operation according to the bi-directional indication information.

3. The method for establishing a VLAN connection according to claim 1, wherein when a point-to-multipoint VLAN connection is established,
    the first signaling message comprising the VLAN ID is the first signaling message comprising an uplink VLAN ID and a downlink VLAN ID; and
    the registering the VLAN ID comprises registering the uplink VLAN ID at an uplink port and registering the downlink VLAN ID at a downlink port.

4. The method for establishing a VLAN connection according to claim 3, wherein when a point-to-multipoint VLAN connection is established, the first signaling message further comprises an instruction for sharing learning, wherein the instruction for sharing learning indicates that an uplink VLAN and a downlink VLAN are set to make them to switch into a mode of sharing learning; and
    the registering the VLAN ID further comprises: performing the instruction for sharing learning.

5. The method for establishing a VLAN connection according to claim 1, wherein
    when a multipoint-to-multipoint VLAN connection is established, the first signaling message further comprises bi-directional indication information, wherein the bi-directional indication information indicates that a same VLAN ID is used in both forward and backward directions; and the registering the VLAN ID comprises registering the VLAN ID and performing an operation according to the bi-directional indication information; and when the multipoint-to-multipoint VLAN connection is established, the first signaling message further comprises an instruction for enabling a learning function, wherein the instruction for enabling a learning function indicates to enable a learning function within the VLAN; and the registering the VLAN ID comprises registering the VLAN ID and performing the instruction for enabling a learning function.

6. A node apparatus, comprising:
a receiving module;
a registration module; and
a sending module, wherein:
the receiving module is configured to: receive a first signaling message, wherein the first signaling message comprises a Virtual Local Area Network (VLAN) ID, explicit routing information and bandwidth request information; and receive a second signaling message after the first signaling message is sent to another node, wherein the second signaling message is a response to the first signaling message;
the sending module is configured to send the first signaling message to the other node; and
the registration module is configured to register the VLAN ID once a port on the node apparatus is determined as satisfying the bandwidth request information in the first signaling message after the second signaling message is received.

7. The method for establishing a VLAN connection according to claim 1, wherein
when a point-to-point VLAN connection is established, the first signaling message further comprises an instruction for disabling a learning function, wherein the instruction for disabling a learning function indicates that a node receiving the instruction is forbidden to learn within the VLAN; and the registering the VLAN ID comprises registering the VLAN ID and performing an operation according to the instruction for disabling a learning function.

8. The method according to claim 1, wherein when a point-to-multipoint VLAN connection is established, the first signaling message further comprises an instruction for sharing learning, wherein the instruction for sharing learning indicates that an uplink VLAN and a downlink VLAN are set to make them become a mode of sharing learning; and the registering the VLAN ID further comprises: performing the instruction for sharing learning.

9. The apparatus according to claim 6, wherein the registration module is configured to register the VLAN ID and perform an operation according to an instruction which is contained in the first signaling message and indicates that a node receiving the instruction is forbidden to learn within the VLAN, when a point-to-point VLAN connection is established.

10. The apparatus according to claim 6, wherein the registering module is configured to perform an instruction for sharing learning which is contained in the first signaling message and indicates that an uplink VLAN and a downlink VLAN are set to make them become a mode of sharing learning, when a point-to-multipoint VLAN connection is established.

11. The apparatus according to claim 6, wherein the registering module is configured to register the VLAN ID and perform an operation for enabling a learning function which is contained in the first signaling message and indicates to enable a learning function within the VLAN, when a multipoint-to-multipoint VLAN connection is established.

* * * * *